US012659716B2

(12) United States Patent
Lu et al.

(10) Patent No.: US 12,659,716 B2
(45) Date of Patent: Jun. 16, 2026

(54) SUPPORTING COMPATIBILITY

(71) Applicant: Telefonaktiebolaget LM Ericsson (publ), Stockholm (SE)

(72) Inventors: Yunjie Lu, Shanghai (CN); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 438 days.

(21) Appl. No.: 18/286,733

(22) PCT Filed: Mar. 31, 2022

(86) PCT No.: PCT/EP2022/058666
§ 371 (c)(1),
(2) Date: Oct. 12, 2023

(87) PCT Pub. No.: WO2022/218725
PCT Pub. Date: Oct. 20, 2022

(65) Prior Publication Data
US 2024/0196191 A1      Jun. 13, 2024

(30) Foreign Application Priority Data

Apr. 13, 2021    (WO) ................ PCT/CN2021/087020

(51) Int. Cl.
*H04W 8/18*        (2009.01)
*H04L 67/02*       (2022.01)
*H04L 69/22*       (2022.01)

(52) U.S. Cl.
CPC ............... *H04W 8/18* (2013.01); *H04L 67/02* (2013.01); *H04L 69/22* (2013.01)

(58) Field of Classification Search
CPC ....... H04W 8/18; H04W 24/02; H04W 48/18; H04L 67/02; H04L 69/22; H04L 67/51
See application file for complete search history.

(56) References Cited

FOREIGN PATENT DOCUMENTS

| | | |
|---|---|---|
| CN | 110 557 744 A | 12/2019 |
| WO | 2021/052761 A1 | 3/2021 |
| WO | 2021/083926 A1 | 5/2021 |

OTHER PUBLICATIONS

International Search Report and Written Opinion dated Jul. 28, 2022 issued in International Patent Application No. PCT/EP2022/058666 (18 pages).

(Continued)

*Primary Examiner* — Dhaval V Patel
(74) *Attorney, Agent, or Firm* — Rothwell, Figg, Ernst & Manbeck, P.C.

(57) ABSTRACT

A method (500) performed by a service consumer. The method includes invoking a service provided by a first service producer. Invoking the service comprises generating a service request message and transmitting the service request message to the first service producer. In some embodiments, transmitting the service request message to the first service producer comprises transmitting, to the first service producer, a message comprising a header and a body, the body comprising the service request message and the header comprising service consumer information comprising: i) first feature information that identifies a set of one or more features of a service that is provided by a second service producer and that is supported by the service consumer, and/or ii) first version information that identifies set of one or more versions of an application programming interface (API) for the service provided by the second service producer that is supported by the service consumer.

25 Claims, 10 Drawing Sheets

(56)                    References Cited

OTHER PUBLICATIONS

3GPP TS 29.500 V17.2.0, Mar. 2021, Technical Specification, 3rd Generation Partnership Project; Technical Specification Group Core Network and Terminals; 5G System; Technical Realization of Service Based Architecture; Stage 3 (Release 17), XP052000194 (100 pages).
3GPP TS 29.503 V17.2.0, Mar. 2021, Technical Specification, 3rd Generation Partnership Project; Technical Specification Group Core Network and Terminals; 5G System; Unified Data Management Services; Stage 3 (Release 17), XP052000200 (377 pages).
Ericsson, "Consumer Information for Direct Notification Report," 3GPP Tdoc (Change Request) C4-213584, 3GPP TSG-CT WG4 Meeting #104-e, XP052018294, Retrieved on Jun. 2, 2021 (5 pages).
3GPP TS 29.501 V16.0.0, Jun. 2019, Technical Specification, 3rd Generation Partnership Project; Technical Specification Group Core Network and Terminals; 5G System; Principles and Guidelines for Services Definition; Stage 3 (Release 16) (69 pages).
ETSI TS 123 502 V16.7.1, Jan. 2021, Technical Specification, 5G; Procedures for the 5G System (5GS) (3GPP TS 23.502 version 16.7.1 Release 16) (607 pages).
ETSI TS 129 510 V16.6.0, Jan. 2021, Technical Specification, 5G; 5G System; Network function repository services; Stage 3 (3GPP TS 29.510 version 16.6.0 Release 16) (227 pages).
ETSI TS 129 518 V16.6.0, Jan. 2021, Technical Specification, 5G; 5G System; Access and Mobility Management Services; Stage 3 (3GPP TS 29.518 version 16.6.0 Release 16) (302 pages).
ETSI TS 129 503 V16.6.0, Jan. 2021, Technical Specification, 5G; 5G System; Unified Data Management Services; Stage 3 (3GPP TS 29.503 version 16.6.0 Release 16) (380 pages).

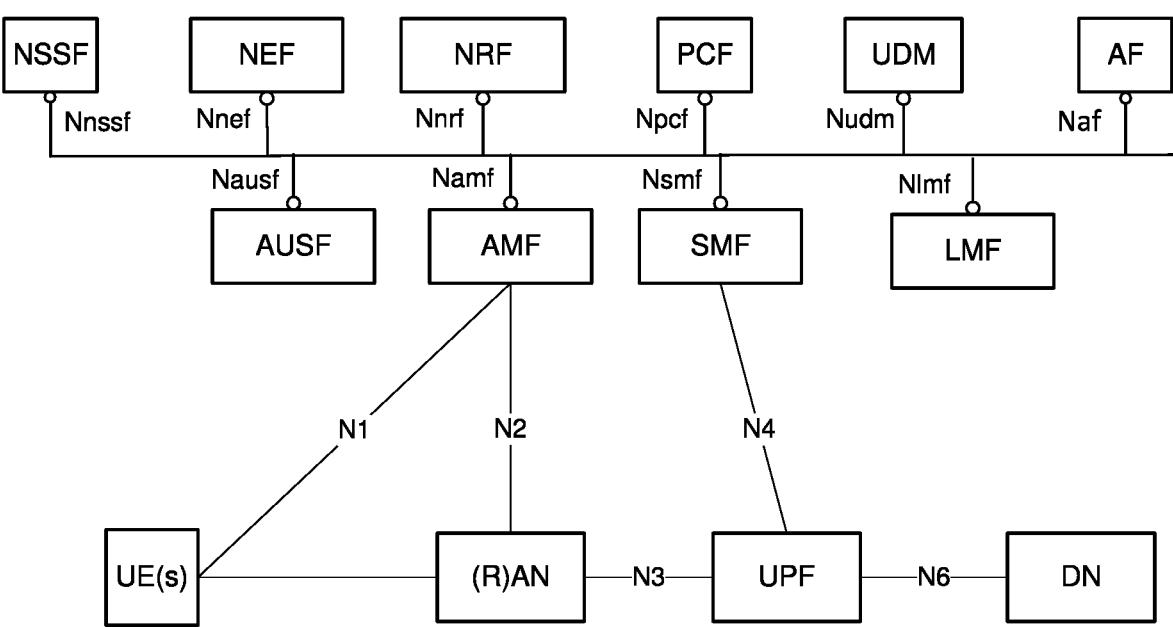
FIG. 1

500

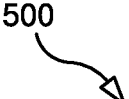

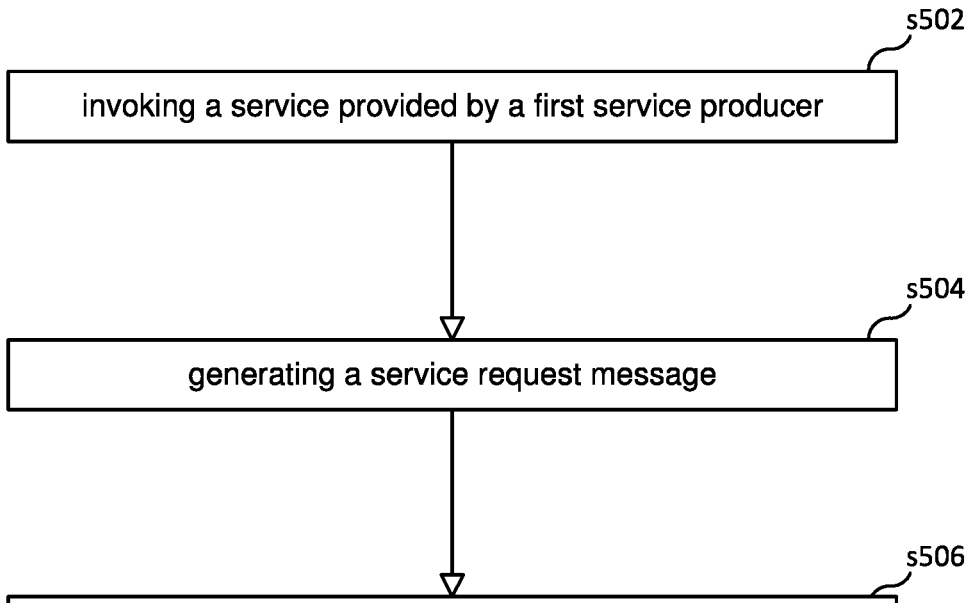

s502 invoking a service provided by a first service producer s504 generating a service request message s506 transmitting, to the first service producer, a message comprising a header and a body, the header comprising: service consumer information that comprises: i) first feature information that identifies a set of one or more features of a service that is provided by a second service producer and that is supported by the service consumer, and/or ii) first version information that identifies set of one or more versions of an application programming interface, API, for the service provided by the second service producer that is supported by the service consumer

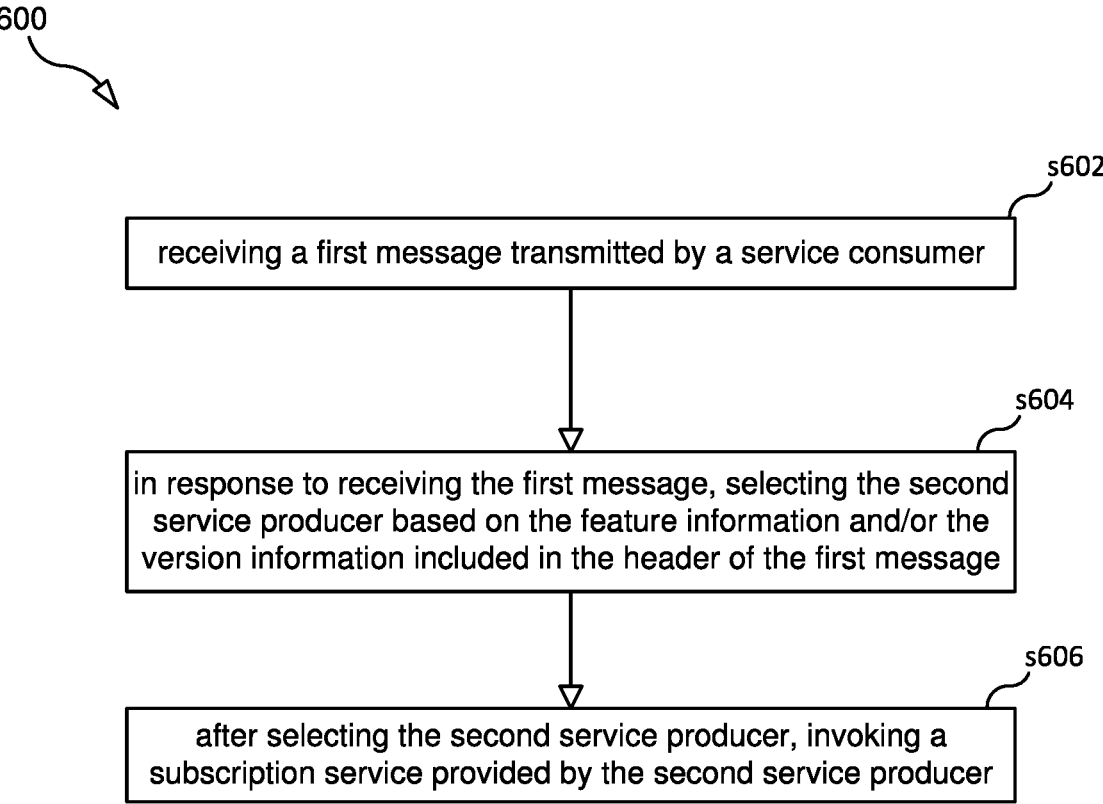

s602 receiving a first message transmitted by a service consumer s604 in response to receiving the first message, selecting the second service producer based on the feature information and/or the version information included in the header of the first message s606 after selecting the second service producer, invoking a subscription service provided by the second service producer

FIG. 6

700
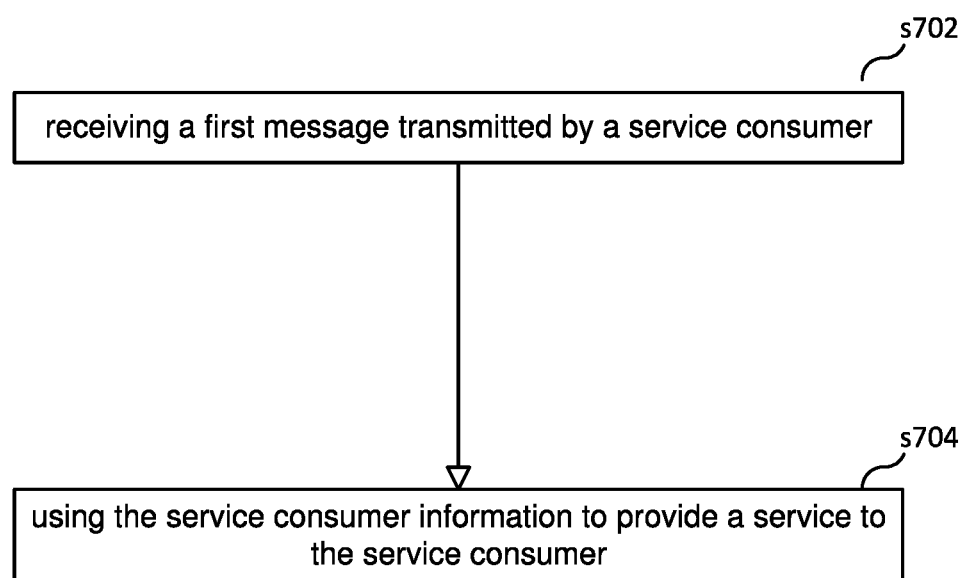
s702
receiving a first message transmitted by a service consumer
s704
using the service consumer information to provide a service to the service consumer
FIG. 7

800 s802 invoking a subscription service provided by a first service producer s804 generating a service request message s806 transmitting the service request message to the first service producer

900

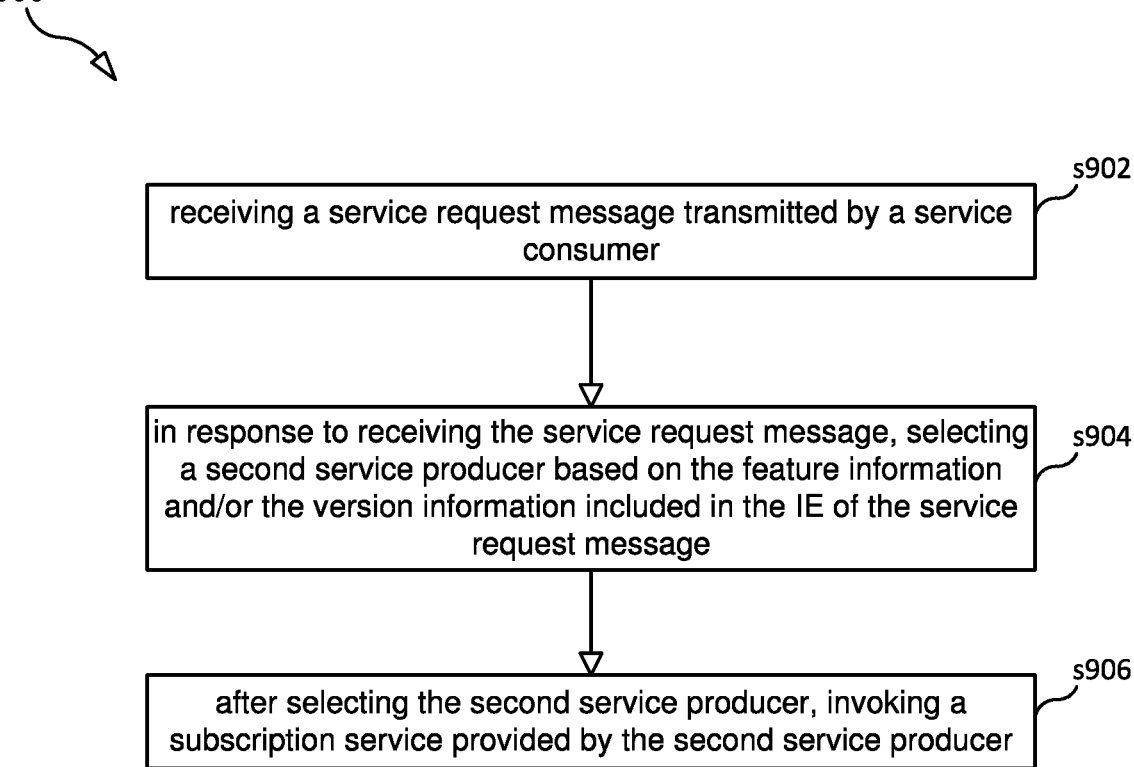

s902 receiving a service request message transmitted by a service consumer s904 in response to receiving the service request message, selecting a second service producer based on the feature information and/or the version information included in the IE of the service request message s906 after selecting the second service producer, invoking a subscription service provided by the second service producer

FIG. 9

SUPPORTING COMPATIBILITY

CROSS REFERENCE TO RELATED APPLICATIONS

This application is a 35 U.S.C. § 371 National Stage of International Patent Application No. PCT/EP2022/058666, filed 2022 Mar. 31, which claims priority to International Patent Application No. PCT/CN2021/087020, filed 2021 Apr. 13, which is incorporated by this reference.

TECHNICAL FIELD

This disclosure relates to a service consumer providing information regarding application programming interface (API) capabilities and/or features of a service provided by a service producer that are supported by the service consumer.

BACKGROUND

The 3rd Generation Partnership Project (3GPP) 5G core (5GC) has specified that a first Network Function (NF) producer (a.k.a., "service producer") may subscribe to events on a second NF producer on behalf of an NF consumer (a.k.a., service consumer) and requires the second NF producer to send the notifications directly to the NF consumer. For example, when a Network Enforcement Function (NEF) subscribes to a UE reachability event on a Unified Data Manager (UDM), the UDM may subscribe to UE Reachability on an Access and Mobility Management Function (AMF) and require the AMF to directly delver the event report to a callback URI specified by the NEF (see, e.g., 3GPP TS 23.502 clause 4.15.3.2.2).

As specified in 3GPP TS 29.501 clause 4.3, OpenAPI uses version numbering to control the API specification and compatibility where the increment of major version indicates backward incompatible changes introduce in API, i.e. there is a very high probability that the interwork will fail between NF consumer/NF producer supporting different major OpenAPI versions. Besides API version control, as specified in 3GPP TS 29.500 clause 6.6.2, 3GPP 5G API provides further mechanism to allow NF producer and NF consumer to negotiate optional features, i.e. backward compatible changes which may affect information exchanged via API operations

SUMMARY

Certain challenges presently exist. For instance, both API version control and feature negotiation are applied between NF consumer and NF producer directly, i.e. the API version control and feature negotiation cannot be extended to another NF producer. This limitation can impact the service flow in scenarios where the first NF producer subscribes to an event on a second NF producer on behalf of the NF consumer due to the fact that there is no API version control and feature negotiation between the NF consumer and the second NF producer.

Accordingly, in one aspect there is provided a method performed by a service consumer. In one embodiment, the method includes invoking a service provided by a first service producer (e.g., an instance of a UDM). Invoking the service comprises generating a service request message and transmitting the service request message to the first service producer. In some embodiments, transmitting the service request message to the first service producer comprises transmitting, to the first service producer, a message (e.g., a Hypertext Transfer Protocol, HTTP, message) comprising a header and a body, the body comprising the service request message and the header comprising service consumer information comprising: i) first feature information that identifies a set of one or more features of a service that is provided by a second service producer and that is supported by the service consumer, and/or ii) first version information that identifies set of one or more versions of an application programming interface (API) for the service provided by the second service producer that is supported by the service consumer. In another embodiment, service request message comprises an information element, IE, comprising service consumer information comprising: i) feature information that identifies a set of one or more features of a service provided by a second service producer that is supported by the service consumer and/or ii) version information that identifies a version of an API for the service provided by the second service produce that is supported by the service consumer.

In another aspect there is provided a method performed by a first service producer. In one embodiment, the method includes receiving a first message (e.g., a Hypertext Transfer Protocol, HTTP, message) transmitted by a service consumer. The first message comprises a header and a body. The body comprises a service request message. The header comprises service consumer information comprising: i) first feature information that identifies a set of one or more features of a service provided by a second service producer that is supported by the service consumer and/or ii) first version information that identifies a version of an application programming interface (API) for the service provided by the second service producer that is supported by the service consumer.

In another embodiment the method performed by the first service produce comprises receiving a service request message transmitted by a service consumer. The service request message comprises an information element, IE. The IE comprises service consumer information comprising: i) feature information that identifies a set of one or more features of a service provided by a second service producer that is supported by the service consumer and/or ii) version information that identifies a version of an application programming interface (API) for the service provided by the second service producer that is supported by the service consumer.

In another aspect there is provided a method performed by a first service producer. The method includes receiving a message (e.g., a Hypertext Transfer Protocol, HTTP, message) transmitted by a first service producer. The message comprises a header and a body. The body comprises a service request message. The header comprises service consumer information comprising: i) feature information that identifies a set of one or more features of a service provided by the second service producer that is supported by the service consumer and/or ii) version information that identifies a version of an application programming interface (API) for the service provided by the second service producer that is supported by the service consumer.

In another aspect there is provided a computer program comprising instructions which when executed by processing circuitry of a network node causes the network node to perform any one of the methods disclosed herein. In another aspect there is provided a carrier containing the computer program, wherein the carrier is one of an electronic signal, an optical signal, a radio signal, and a computer readable storage medium. In another aspect there is provided a network node, where the network node is configured to perform any one of the methods disclosed herein. In some embodiments, the network node includes processing circuitry and a memory containing instructions executable by the processing circuitry, whereby the network node is configured to perform any one of the methods disclosed herein.

The aspects and embodiments disclosed herein are advantageous for numerous reasons. For example, the embodiments provide a mechanism to allow API version control and feature negotiation between NF consumer and a second NF producer for event exposure service, which facilitates that the service flow will run as expected and not be negatively impacted.

BRIEF DESCRIPTION OF THE DRAWINGS

The accompanying drawings, which are incorporated herein and form part of the specification, illustrate various embodiments.

FIG. 1 illustrates an exemplifying wireless communication system.

FIG. 5 is a flowchart illustrating a process according to an embodiment.

FIG. 6 is a flowchart illustrating a process according to an embodiment.

FIG. 7 is a flowchart illustrating a process according to an embodiment.

FIG. 9 is a flowchart illustrating a process according to an embodiment.

DETAILED DESCRIPTION

Figure 2:
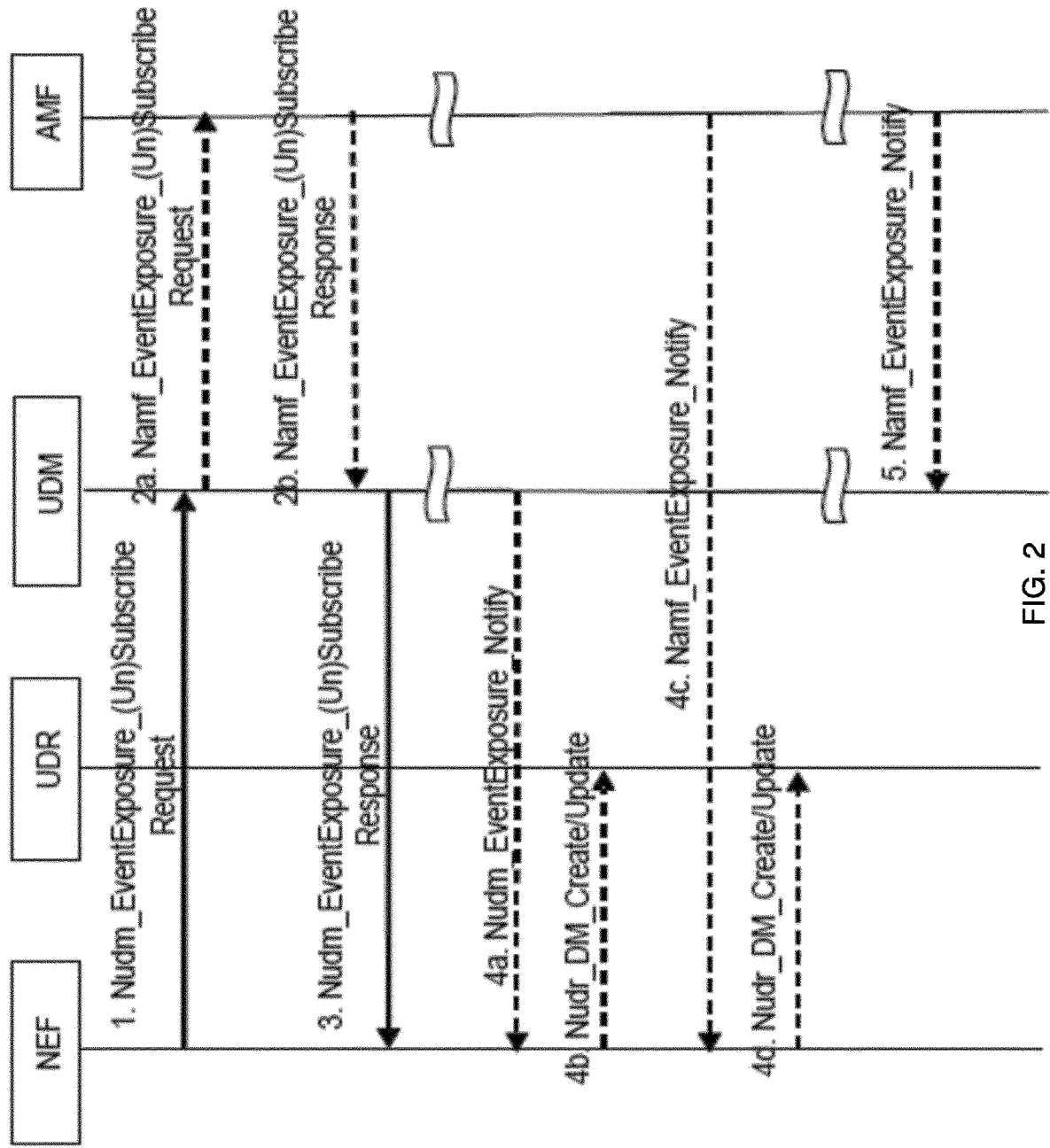
FIG. 2 is a message flow diagram illustrating a message flow according to an embodiment.

FIG. 1 illustrates an exemplifying wireless communication system 100 represented as a 5G network architecture that uses service-based interfaces (SBIs). Communication system 100 comprises an Access network (AN) (e.g., a 5G Access Network (5G-AN), which is an access network comprising a Next Generation (NG) Radio Access Network (NG-RAN) and/or a non-3GPP access network connecting to a 5G Core Network) and a Core network (CN) comprising network entities (NEs) in the form of network Functions (NFs). Typically, the AN comprises base stations, e.g. such as evolved Node Bs (eNBs) or 5G base stations (gNBs) or similar. As shown in FIG. 1, user equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF), a Network Exposure Function (NEF), a Location Management Function (LMF), and a Network Repository Function (NRF).

The NFs in the 5G core network architecture are independent modularized functions, which allows independent evolution and scaling. Modularized function design enables the 5G core network to support various services in a flexible manner. Each NF in the core network interacts with another NF directly, but it is possible to use intermediate functions to route messages from one NF to another NF.

The service(s) that an NF provides to other authorized NFs can be exposed to the authorized NFs through an SBI. In FIG. 1, the SBIs are indicated by the letter "N" followed by the name of the NF, e.g. Namf for the SBI of the AMF and Nsmf for the SBI of the SMF etc.

Some properties of the NFs shown in FIG. 1 may be described in the following manner. The AMF provides UE-based authentication, authorization and mobility management, etc. A UE even if using multiple access technologies is typically connected to a single AMF, since the AMF is independent of the access technologies. However, the UE can be connected to, for example, two AMFs if the UE is connected to two different PLMNs using separate types of access networks (e.g., the UE is connected to a first PLMN via a 3GPP access network and the UE is also connected to a second PLMN via a non-3GPP access network). The SMF is responsible for session management and allocates IP addresses to UEs and selects and controls the UPF for data transfer with respect to the UEs. If a UE has multiple PDU sessions, different SMFs may be allocated to each PDU session to manage them individually and possibly provide different functionalities per PDU session. The AF provides information on the packet flow to PCF responsible for policy control in order to support Quality of Service (QOS). Based on the information, PCF determines policies about mobility and session management to make AMF and SMF operate properly. The AUSF supports authentication function for UEs and thus stores data for authentication of UEs or similar while UDM stores subscription data of UEs. The Data network (DN), not part of the 5G core network, provides Internet access or operator services and similar. The LMF receives measurements and assistance information from the NG-RAN and the UE via the AMF to compute the position of the UE.

The NRF supports the following functionality: 1) maintains the NF profile of available NF instances and their supported services; 2) allows other NF instances to subscribe to, and get notified about, the registration in NRF of new NF instances of a given type; and 3) supports a discovery function. It receives NF Discover requests from NF instances, and provides the information of the available NF instances fulfilling certain search criteria. Features of the NRF are specified in 3GPP Technical Specification (TS) 29.501 (see e.g. 3GPP TS 29.501 v16.0.0).

A number of 5G core network NFs of different types are typically instantiated per default in a 5G core network, e.g. such as an AMF, a NRF, a PCF and a SMF etc. Other 5G core network NFs may be instantiated as needed and several NFs of the same type can also be instantiated if required, e.g. to distribute load to additional NF(s) of the same typ. Thus, an NF instance may be seen as an example or a specimen of a certain NF. Herein, the terms NF and NF instance are used interchangeably, unless otherwise expressly stated or is apparent from the context in which the terms are used. An NF instance exposes one or more NF Service Instances.

As noted above challenges presently exist in scenarios where a first service producer subscribes to an event on a second service producer on behalf of a service consumer due to the fact that there is no API version control and feature negotiation between the consumer and the second producer. Such as scenario is illustrated in the message flow diagram shown in FIG. 2, which corresponds to FIG. 4.15.3.2.2-1 of 3GPP TS 23.502 V16.7.1 (TS 23.502). In this example the NEF is the service consumer, the UDM is the first service producer and the AMF is the second service producer. As shown in FIG. 2, the NEF subscribes to one or several monitoring events by sending the Nudm_EventExposure_Subscribe request to the UDM. Some monitoring events (e.g. loss of connectivity for a UE), require that, on behalf of the NEF, the UDM sends the Namf_EventExposure_Subscribe request to the AMF serving that UE. As the UDM itself is not the Event Receiving NF, the UDM shall additionally provide the notification endpoint of itself besides the notification endpoint of NEF. When the AMF detects that the monitored event occurs the AMF sends the event report, by means of Namf_EventExposure_Notify message, to the associated notification endpoint of the NEF.

Consider a scenario where the NEF supports only Namf API version 1.x, but the UDM itself supports Namf API version 2.x and invoked 2.x version API on AMF. As a result, the AMF will generate an event report notification following AMF API 2.x and send the event report directly to the NEF, but the NEF most likely will not be able to process the event report because the NEF only supports AMF API 1.x, whereas the event report was generated and transmitted according to AMF API 1.x.

Consider another scenario where the NEF requires certain information from the AMF event exposure service controlled by an optional feature, but the UDM doesn't support the optional feature (there is no mechanism now for UDM to known whether NEF support the optional feature of AMF or not) thus the UDM subscribes to AMF without telling AMF the optional feature is required. As a result, the AMF will generate the event report notification without the information for the desired optional feature. The service flow, therefore, is broken.

Figure 3:
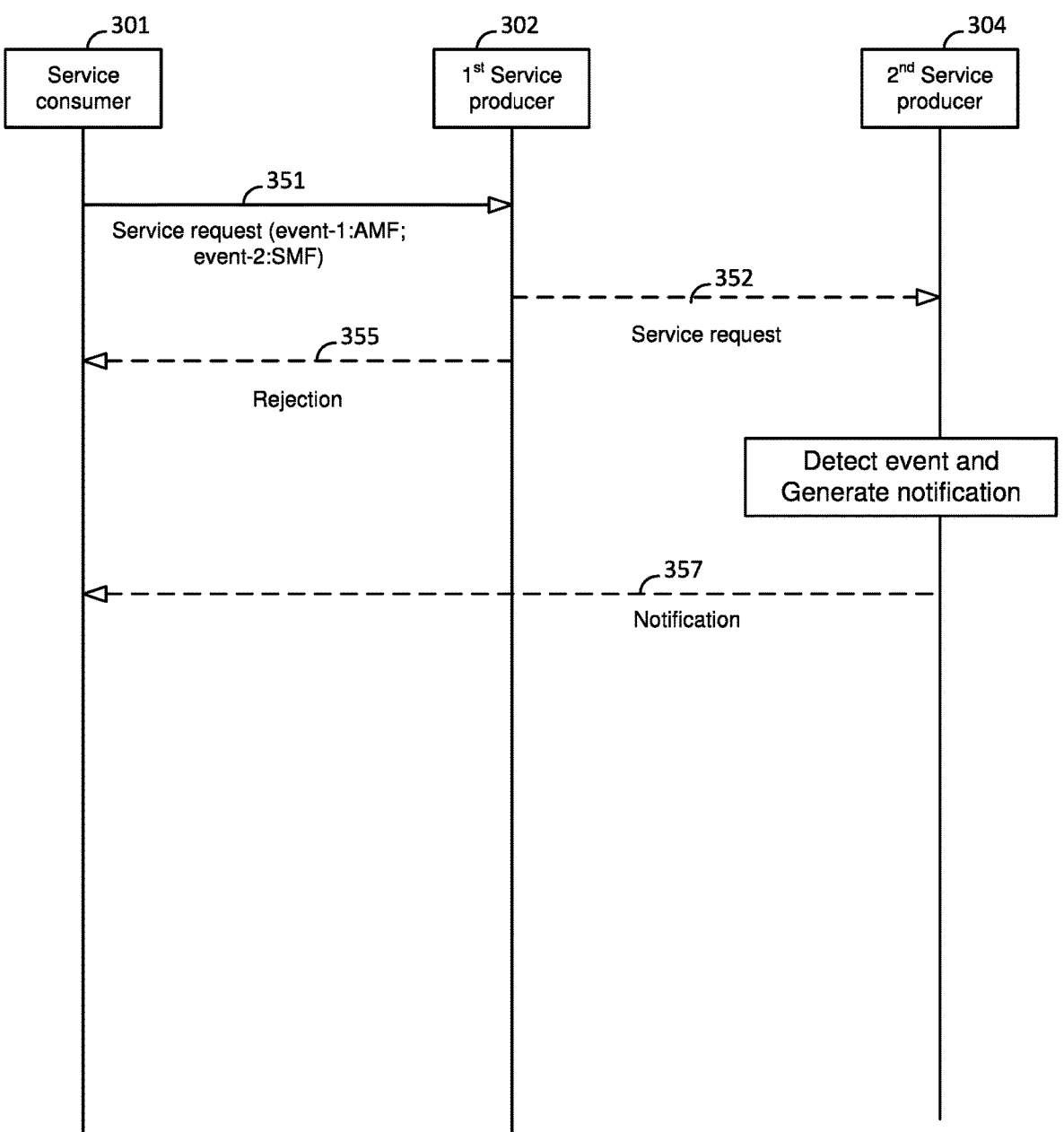
FIG. 3 is a message flow diagram illustrating a message flow according to an embodiment.

FIG. 3 is a message flow diagram illustrating a message flow according to an embodiment which overcomes the disadvantages described above. The message flow may begin with a service consumer 201 transmitting a service request message 351 (e.g., a subscribe request, such as, for example, the above mentioned Nudm_EventExposure_Subsubscribe to a monitoring event (event-2) at a third service produce (i.e., SMF in this example).

In one use case, service consumer 301 transmits the service request message 351 to the first service producer 302 by transmitting, to the first service producer 302, a message (e.g., an application layer protocol message), such as a Hypertext Transfer Protocol (HTTP) message (e.g., an HTTP GET or an HTTP PUT message), comprising a set of one or more headers and a body, where the body includes the service request message.

In one embodiment, at least one of the headers of the message comprises service consumer information that comprises: i) first feature information that identifies a set of one or more features of a service that is provided by a second service producer and that is supported by the service consumer, and/or ii) first version information that identifies one or more versions of an API for the service provided by the second service producer that is supported by the service consumer. The service consumer information may also contain service identifier that identifies the service, such as, for example, the service name (e.g., Namf_EventExposure) or the name of the API for the service (e.g., namf-evts). In this example where service consumer 301 is subscribing to two different monitoring events (event-1 on AMF and event-2 on SMF), the service consumer information may comprise first service consumer information related to the first monitoring event and a second service consumer information related to the second monitoring event. The first and second service consumer information may be contained within a single header instance or they may be contained in separate header instances.

In one embodiment, the header that contains the service consumer information is a new header (i.e., a header not yet defined by 3GPP). This new header may be named "3gpp-callback-compatibility." This new header may be defined as shown below:

TABLE 1

| |
|---|
| 3gpp-callback-compatibility = "3gpp-callback-compatibility" ":" parameter * (";" OWS parameter) |
| parameter = parametername "=" token |
| parametername = "servciename" / "apiversion" / "supportedfeatures" |
| The following parameters are defined: |
| - servciename: the value of this parameter indicates the service it supports as NF consumer to received callback notifications. The service names are specified in clause 6.1.6.3.11 TS 29.510. |
| - apiversion: indicates an array of the service API version(s) it supports. e.g. [ "v1", "v2" ]. |
| - supportedfeatures: indicates the optional features of the API it supported as NF consumer. The supportedFeatures is specified in TS 29.571 as a sting containing a bitmask. | scribe request) to a first service producer 302 (e.g., a UDM). For example, as shown in FIG. 3, the service request message 351 is a message that the service consumer 301 sent to UDM to subscribe to a monitoring event (event-1) at a second service producer (i.e., AMF in this example) and to As noted above, the header may appear multiple times, one per service (e.g., one per monitoring event); or the multiple headers can be combined to one header with their values connected as comma-separated list. Examples are illustrated below:

TABLE 2

| Example 1; Multiple Headers |
|---|
| 3gpp-callback-compatibility: servciename="namf-evts"; apiversion="[v1,v2]"; supportedFeatures="ab34d" |
| 3gpp-callback-compatibility: servciename="nsmf-event-exposure"; apiversion="[v2]"; supportedFeatures="746" |

TABLE 3

| Example 2; Combined Header |
|---|
| 3gpp-callback-compatibility: servciename="namf-evts"; apiversion="[v1,v2]"; supportedFeatures="ab34d", servciename="nsmf-event-exposure"; apiversion="[v2]"; supportedFeatures="746" |

In another embodiment, the header is an existing 3GPP header. For example, in one embodiment the header contains a Binding Indication as well as the service consumer information (e.g., the header is a modified version of the currently specified 3gpp-Sbi-Binding header). As described in TS 29.500, the 3gpp-Sbi-Binding contains a comma-delimited list of Binding Indications. As further described in TS 29.500:

TABLE 4

The encoding of the header follows the ABNF as defined in IETF RFC 7230.
3gpp-Sbi-Binding = "3gpp-Sbi-Binding" ":" 1#(OWS "bl=" blvalue 1*(";" OWS parameter) [";" OWS recoverytime] [";" OWS notif-receiver] [";" OWS "group=" groupvalue] [1*(";" OWS groupparameter)])
blvalue = "nf-instance" / "nf-set" / "nfservice-instance" / "nfservice-set"
parameter = parametername "=" token
parametername = "nfinst" / "nfset" / "nfservinst" / "nfserviceset" / "servname" / "scope" / "backupamfinst"
recoverytime = "recoverytime=" OWS date-time
notif-receiver = "nr=" URI      ; URI production rule from IETF RFC 3986 [14], Appendix A
groupvalue = "true" / "false"
groupparameter = groupparametername "=" token
groupparametername = "oldgroupid" / "groupid" / "uribase" / "backupnf"
The following parameters are defined:
-     scope: indicates the applicability of a Binding Indication in a service request (or notification or callback response). This may take one of the following values:
  - "other-service": the binding information applies to other service(s) that the NF Service Consumer may later on provide as an NF Service Producer (see clause 6.12.3);
  - "subscription-events": the binding information applies to subscription change event notifications (see clause 6.12.4);
  - "callback": the binding information applies to notification or callback requests (see clauses 6.12.4 and 6.12.5).
  The absence of this parameter in a Binding Indication in a service request (or notification or callback response) shall be interpreted as "callback".
  Two scope parameters may be present in a Binding Indication if the binding information applies to notification/callback requests and to other services.
-     servname (service name): indicates the name of a service, as defined in 3GPP TS 29.510 [8], or a custom service, i.e.:
  - the name of the service that handles a notification or a callback request, when present in a Binding Indication for a subscription or a callback, i.e. with a scope parameter absent or set to "callback"; or
  - the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.
-     recoverytime: indicates the recovery timestamp of the entity corresponding to the highest resiliency level supported for the resource, that is, the higher level binding entity indicated in the Binding Indication. See Table 6.3.1.0-1 of 3GPP TS 23.501 [3] and clause 6.1 of 3GPP TS 23.527 [38]. The date-time type is specified in IETF RFC 5322 [37] and clause 7.1.1.1 of IETF RFC 7231 [11].
-     nr: indicates the URI of the notification endpoint when this binding information is applicable; it applies to callback requests (see clause 6.12.4); if the notification URI does not contain a correlationID in the path (i.e. it is a common notification URI for multiple subscriptions), the correlationID shall be added as a fragment component of the URI (i.e. following the "#" character) at the end of the URI.
-     for the definition and encoding of the blvalue, nfinst, backupamfinst, nfset, nfservinst and nfserviceset see clause 5.2.3.2.5.
-     group: it is a boolean indicating if the binding indication is for a group of resource/session contexts.
-     groupid (group id): indicates the group identifier allocated by the NF (service) instance, one ore more resource/session contexts are sharing the same groupid. The groupid is optional and it may be allocated when the resource/session context is created and then be updated afterwards. The groupid is global unique and it may be encoded using the same mechnaism for the NfInstanceId as specificed in 3GPP TS 29.571 [13].
-     backupnf: indicates the backup NF service instance identifier and/or the backup NF identifier as defined in clause 5.2.2.2.2 or in 3GPP TS 29.510 [8], which shall be used when preferred binding entity is not reachable if supported.
-     oldgroupid (old group id): indicates the group identifier allocated by the NF (service) instance previously and to be replaced by the groupid, hence it shall only be present when to update a Binding Indication for multiple texts. When the if the oldgroupid is present, the groupid shall also be present to indicate the new groupid allocated.
-     uribase: identify the apiroot and path segments part in the resource URI or notification/callback URI which is common to multiple contexts. This parameter may only be present when to update a Binding Indication for multiple text and when the "group" is set to "true". When included, it indicates that all resources or notification contexts with this uribase will use the updated Binding Indication subsequently. More than one uribase may be present.

In one embodiment the definition of the 3gpp-Sbi-Binding is extended to include a new parameter called "remotenfeatures", which contains "servicename", "apiversion" and "supportedfeatures" (as proposed in 3gpp-callback-compatibility), as shown below:

supports version 2 the nsmf-event-exposure API (as shown in Table 2 the service consumer has indicated support only for v2 of the API).

Assuming that the AMF supports either v1 or v2 of the AMF API, then service producer 302 sends to the AMF a

TABLE 5

```
3gpp-Sbi-Binding = "3gpp-Sbi-Binding" ":" 1#(OWS "bl=" blvalue 1*(";" OWS parameter) [";" OWS
recoverytime] [";" OWS notif-receiver] [";" OWS "group=" groupvalue] [1*(";" OWS groupparameter)] [1*(";"
OWS remotenffeatures)])
blvalue    = "nf-instance" / "nf-set" / "nfservice-instance" / "nfservice-set"
parameter = parametername "=" token
parametername                = "nfinst" / "nfset" / "nfservinst" / "nfserviceset" / "servname" / "scope" /
"backupamfinst"
recoverytime = "recoverytime=" OWS date-time
notif-receiver = "nr=" URI        ; URI production rule from IETF RFC 3986 [14], Appendix A
groupvalue = "true" / "false"
groupparameter = groupparametername "=" token
groupparametername = "oldgroupid" / "groupid" / "uribase" / "backupnf"
remotenffeatures = remotenffeatures "=" token
remotenffeatures = "apiversion" / "servicename" / "supportedfeatures"
```

In another embodiment, rather than having the service consumer information being included in a header of the message (e.g., HTTP message), the service request message includes the service consumer information. For example, in one embodiment the service request message includes a set of one or more "CallbackInfo" IEs (that is, one or more IEs of type CallbackInfo), where the CallbackInfo IE is defined as shown below:

message containing the service request message 352, and this message may also contain the feature information provided by service consumer 301, which feature information indicates the features of the namf-evts service that are supported by service consumer 301. For instance, in an embodiment where this feature information is contained within a 3gpp-Sbi-Binding header that is included in the message carrying service request 351, the message contain- Definition of type CallbackInfo

| Attribute name | Data type | P | Cardinality | Description |
|---|---|---|---|---|
| service | ServiceName | M | 1 | Indicates the service name supported by NF consumer. |
| versions | array(string) | O | 1 . . . N | API versions (e.g. "v1") supported by the NF consumer |
| supportedFeatures | SupportedFeatures | O | 0 . . . 1 | Optional Features supported by NF consumer. |

In one embodiment, the SupportedFeatures IE is a string containing a bitmask indicating the supported features.

In one embodiment, in response to receiving service request 351, the first service producer 302 determines, for each service that is provide by another service producer, whether the service producer for the service supports the API version specified by the service consumer. If the service producer for the service does not support the API version specified by the service consumer, the first service producer may send to service consumer 301 a rejection message 355 identifying the service, otherwise if the service producer supports the API, then first service producer 302 transmits a second service request 352 to the service producer for the service, where the second service request identifies the API version supported by the service consumer 301 (the second service request also includes the feature information provided by the service consumer).

Using Example 1 from Table 2 as an example, when service produce 302 receives the message containing the headers shown in Table 2, service produce will perform the following steps: (1) determine whether the AMF that can provide the requested namf-evts service supports either version 1 or version 2 of the namf-evts API (as shown in Table 2 the service consumer has indicated support for both v1 and v2 of the API) and (2) determine whether the SMF that can provide the requested nsmf-event-exposure service ing the service request 352 that is sent to the AMF will also contain the 3gpp-Sbi-Binding header (the message containing the service request 352 may also contain another 3gpp-Sbi-Binding header—e.g., a Binding Indication for subscription change event notification from the second service produce 304 to the first service producer 302 (e.g., notification to service producer 302 upon AMF change). After receiving service request 352, the AMF, when it detects the event-1 event, will transmit a notification message 357 to service consumer 301. Advantageously, the AMF can use the feature information included in or with service request 352 when providing the notification 357 to service consumer 301. For example, if the feature information indicates that service consumer does not support a particular IE, then AMF will not include that particular IE in the notification 357. Similarly, if the feature information indicates that the service consumer prefers or is capable of processing a particular IE, then AMF may include that particular IE in the notification 357.

Assuming that the SMF does not support v2 of the identified SMF API, then service producer 302 transmits to service consumer the rejection message 355.

Figure 4:
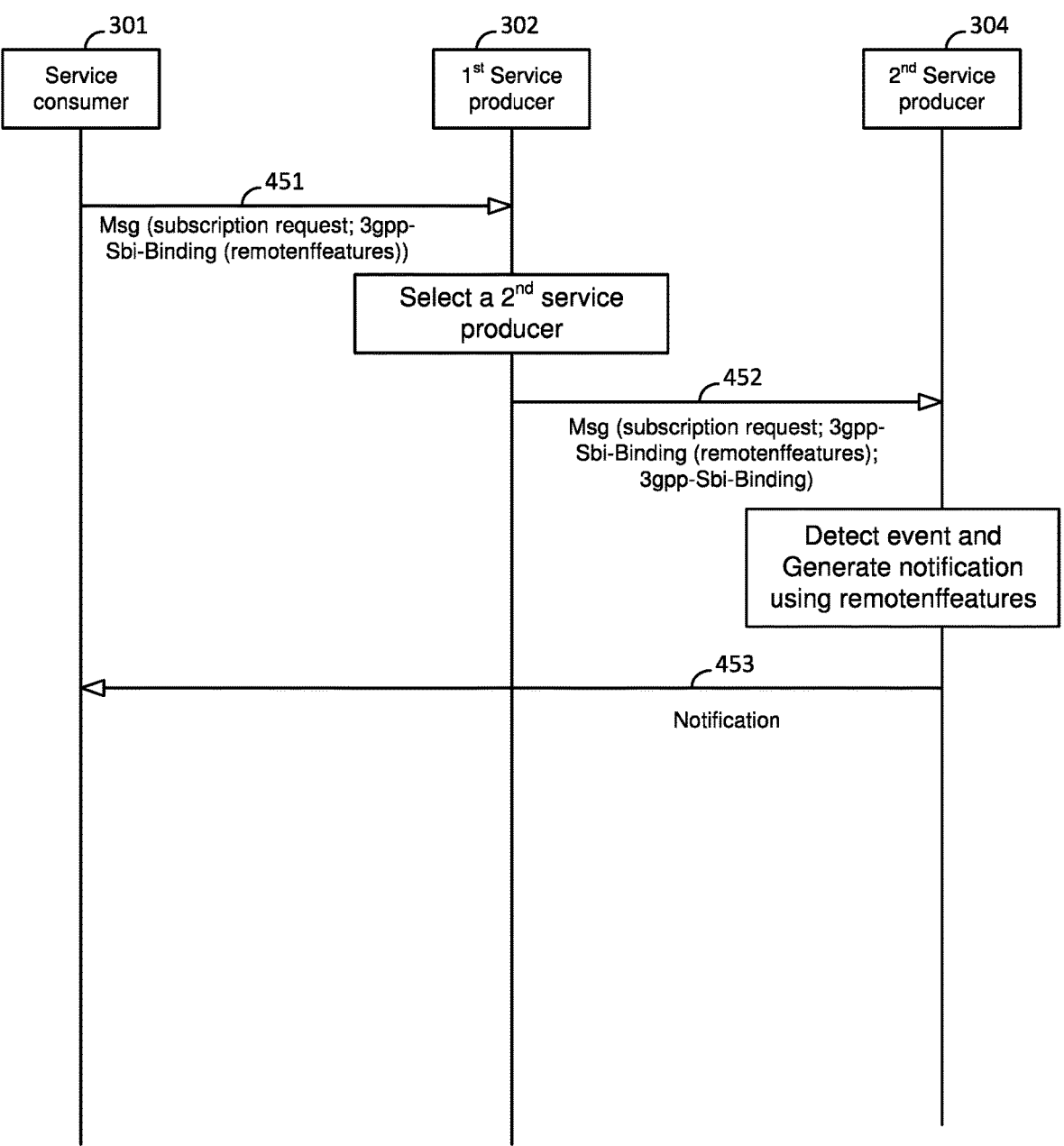
FIG. 4 is a message flow diagram illustrating a message flow according to an embodiment.

FIG. 4 is a message flow diagram illustrating an embodiment. The message flow illustrated begins with service consumer 301 transmitting to first service produce 302 a message 451 that includes: a subscription request and a 3gpp-Sbi-Binding header containing a remotenffeatures parameter that includes the servicename parameter identifying a service, the apiversions parameter identifying one or more supported API versions, and the supportedfeatures parameter identifying one or more supported features.

In response to receive message 451, first service producer 302 selects a second service producer 304 that can provide the request service. This selection may be based on, among other things, information carried in the remotenffeatures parameter. After selecting second service producer 304, first service producer 302 transmits to second service producer 304 a message 452 that comprises a subscription request, the 3gpp-Sbi-Binding included in message 451, and a second 3gpp-Sbi-Binding (e.g., a binding indication for subscription change event notification sent from second service produce 304 to first service producer 302). Next, second service producer 304 detects an event that triggers second service producer 304 to generate and transmit to service consumer 301 a notification 453 regarding the event. Accordingly, second service producer generates the notification using information carried by the remotenffeaturs parameter (e.g., apiversion and supportedfeatures) so that the notification will be supported by service consumer 301 and will contain the IEs preferred by service consumer 301, if any, and then transmits the notification 453.

FIG. 5 is a flowchart illustrating a process 500 according to an embodiment. Process 500 is performed by service consumer 301 and may begin in step s502. Step s502 comprises invoking a service provided by a first service producer (e.g., an instance of a UDM). Invoking the service comprises generating a service request message (step s504) and transmitting the service request message to the first service producer. Transmitting the service request message to the first service producer comprises transmitting, to the first service producer, a message (e.g., a Hypertext Transfer Protocol, HTTP, message) comprising a header and a body (step s506). The body comprises the service request message and the header comprises service consumer information that comprises: i) first feature information that identifies a set of one or more features of a service that is provided by a second service producer and that is supported by the service consumer, and/or ii) first version information that identifies set of one or more versions of an application programming interface (API) for the service provided by the second service producer that is supported by the service consumer.

In some embodiments, the service provided by the second service producer has a name associated therewith and the header comprises the name. In some embodiments, the name is the name of the service (e.g., Namf_EventExposure) or the name of the API for the service (e.g., namf-evts).

In some embodiments the header is a third generation partnership project, 3GPP, header. In some embodiments, the 3GPP header is the 3gpp-Sbi-Binding header. In some embodiments, the header is not currently defined by the 3rd Generation Partnership Project, 3GPP.

In some embodiments, the service provided by the second service producer includes a service operation for sending notifications of an event occurrence to the service consumer. In some embodiments, the service request message is a message for subscribing to the notifications of the event occurrence.

In some embodiments, the first service producer is at least an instance of a Unified Data Management, UDM, function. In some embodiments, the second service producer is at least i) an instance of an Access and Mobility Management function, AMF, or ii) an instance of a Session Management Function, SMF.

FIG. 6 is a flowchart illustrating a process 600 according to an embodiment. Process 600 is performed by first service produce 302 and may begin in step s602. Step s602 comprises receiving a first message (e.g., a Hypertext Transfer Protocol, HTTP, message) transmitted by a service consumer. The first message comprises a header and a body. The body comprises a service request message. The header comprises service consumer information comprising: i) first feature information that identifies a set of one or more features of a service provided by a second service producer that is supported by the service consumer and/or ii) first version information that identifies a version of an application programming interface (API) for the service provided by the second service producer that is supported by the service consumer.

In some embodiments, the service provided by the second service producer has a name associated therewith and the header comprises the name. In some embodiments, the name is the name of the service (e.g, Namf_EventExposure) or the name of the API for the service (e.g., namf-evts).

In some embodiments, the header is a third generation partnership project, 3GPP, header. In some embodiments, the 3GPP header is the 3gpp-Sbi-Binding header. In some embodiments, process 600 further includes the first service producer transmitting to the second service producer a second message comprising the 3gpp-Sbi-Binding header. In some embodiments, the header is not currently defined by the 3rd Generation Partnership Project, 3GPP.

In some embodiments, process 600 further includes the first service producer, in response to receiving the first message, selecting (s604) the second service producer based on the feature information and/or the version information included in the header of the first message. In some embodiments, process 600 further includes, after selecting the second service producer, invoking (s606) a subscription service provided by the second service producer, wherein invoking the subscription service comprises: generating a second service request message; and transmitting the second service request message to the second service producer.

In some embodiments, the service provided by the second service producer includes a service operation for sending notifications of an event occurrence to the service consumer. In some embodiments, the service request message is for subscribing to the notifications of the event occurrence.

In some embodiments, the first service producer is at least an instance of a Unified Data Management, UDM, network function, and the second service producer is at least i) an instance of an Access and Mobility Management Function, AMF, or ii) an instance of a Session Management Function, SMF.

FIG. 7 is a flowchart illustrating a process 700 according to an embodiment. Process 700 is performed by second service producer 304 and may begin in step s702. Step s702 comprises receiving a message (e.g., a Hypertext Transfer Protocol, HTTP, message) transmitted by a first service producer. The message comprises a header and a body. The body comprises a service request message. The header comprises service consumer information comprising: i) feature information that identifies a set of one or more features of a service provided by the second service producer that is supported by the service consumer and/or ii) version information that identifies a version of an application programming interface (API) for the service provided by the second service producer that is supported by the service consumer.

In some embodiments, process 700 further includes the second service producer using the service consumer information to provide a service to the service consumer (step s704). In some embodiments, using the service consumer information to provide the service to the service consumer comprises the second service producer: selecting a version of an application programming interface (API) based on the service consumer information; and transmitting a notification to the service consumer using the selected API. In some embodiments, using the service consumer information to provide the service to the service consumer comprises the second service producer: selecting a set of one or more information elements, IEs, based on the service consumer information; and transmitting to the service consumer a notification comprising the set of one or more IEs.

Figure 8:
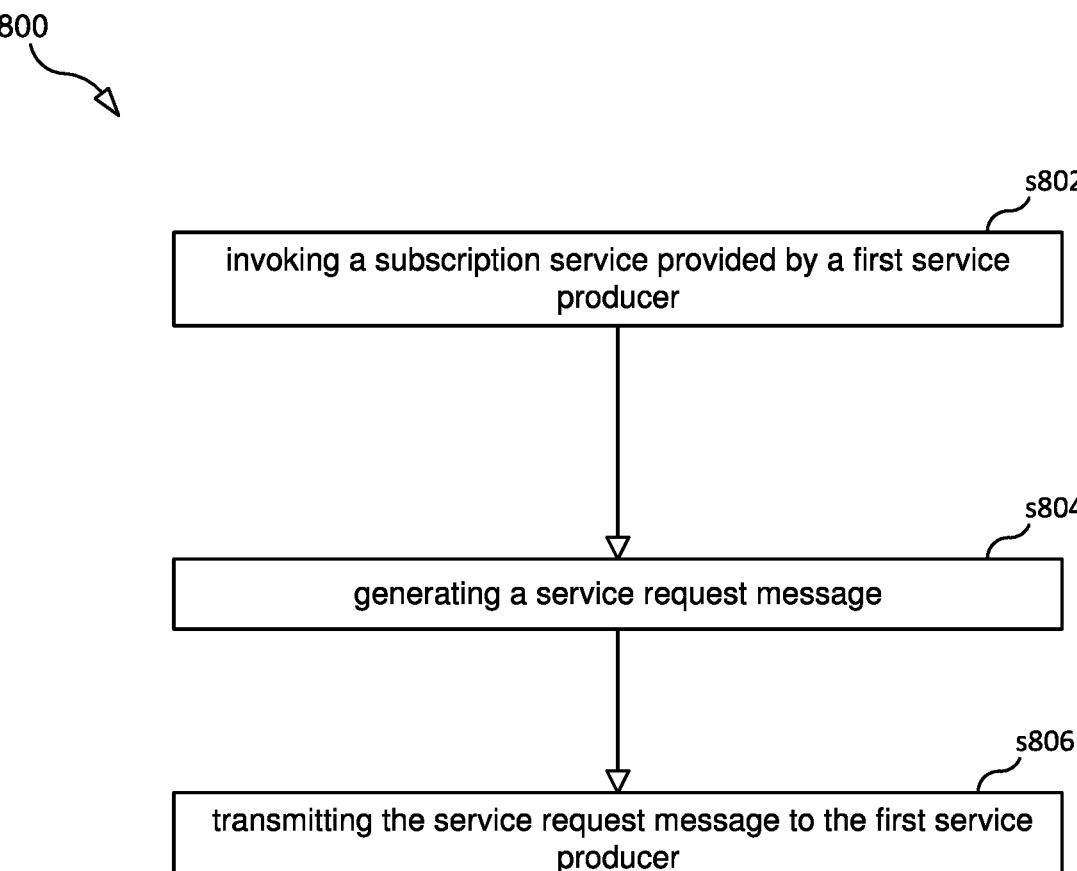
FIG. 8 is a flowchart illustrating a process according to an embodiment.

FIG. 8 is a flowchart illustrating a process 800 according to an embodiment. Process 800 is performed by service consumer 301 and may begin in step s802. Step s802 comprises invoking a subscription service provided by a first service producer (e.g., an instance of a UDM). Invoking the subscription service comprises generating a service request message (step s804) and transmitting the service request message to the first service producer (step s806). The service request message comprises an information element, IE, comprising service consumer information comprising: i) feature information that identifies a set of one or more features of a service provided by a second service producer that is supported by the service consumer and/or ii) version information that identifies a version of an application programming interface (API) for the service provided by the second service produce that is supported by the service consumer.

FIG. 9 is a flowchart illustrating a process 900 according to an embodiment. Process 900 is performed by first service producer 302 and may begin in step s902. Step s902 comprises receiving a service request message transmitted by a service consumer. The service request message comprises an information element, IE, comprising service consumer information comprising: i) feature information that identifies a set of one or more features of a service provided by a second service producer that is supported by the service consumer and/or ii) version information that identifies a version of an application programming interface (API) for the service provided by the second service producer that is supported by the service consumer.

In some embodiments, the service provided by the second service producer has a name associated therewith and the IE comprises the name. In some embodiments, the name is the name of the service (e.g, Namf_EventExposure) or the name of the API for the service (e.g., namf-evts).

In some embodiments, process 900 further includes the first service producer, in response to receiving the service request message, selecting a second service producer based on the feature information and/or the version information included in the IE of the service request message (step s904), wherein the second service producer is an instance of the second service producer.

In some embodiments, process 900 further includes, after selecting the second service producer, invoking a subscription service provided by the second service producer (steps s906). Invoking the subscription service comprises: generating a second service request message; and transmitting the second service request message to the second service producer.

Figure 10:
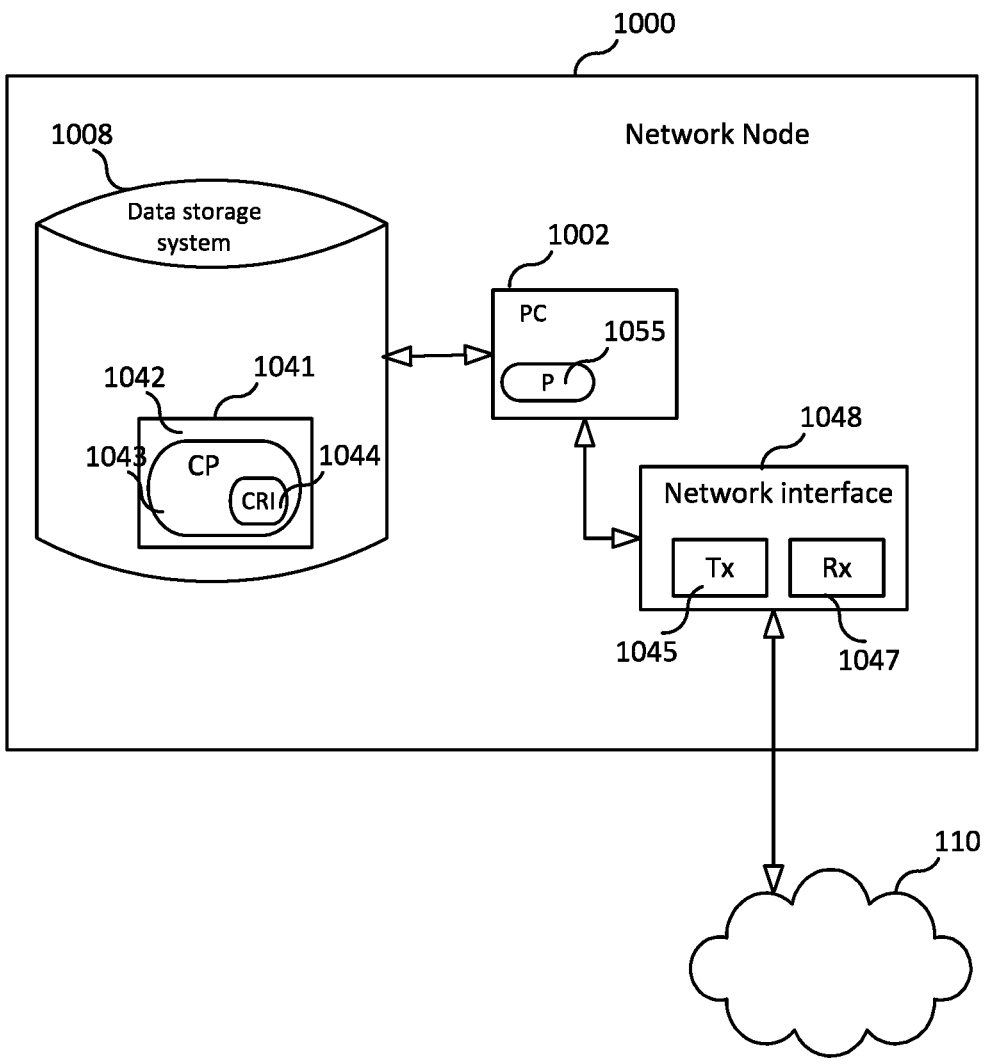
FIG. 10 illustrates a network node according to an embodiment.

FIG. 10 is a block diagram of a network node 1000, according to some embodiments, which can be used to implement service consumer 301, first service producer 302, and/or second service producer 304. For instance, in embodiments where service consumer 201, service producer 202, and/or NRF 204 consists of software, network node

1000 may run (or execute a virtual machine that runs) service consumer 201, service producer 202, and/or NRF 204. As shown in FIG. 10, network node 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 1000 may be a distributed computing apparatus); a network interface 1048 comprising a transmitter (Tx) 1045 and a receiver (Rx) 1047 for enabling network node 1000 to transmit data to and receive data from other machines connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable storage medium (CRSM) 1042 storing a computer program (CP) 1043 comprising computer readable instructions (CRI) 1044. CRSM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes network node 1000 to perform steps described herein (e.g., steps described herein with reference to the flow charts). In other embodiments, network node 1000 may be configured to perform steps described herein without the need for code. That is, for example, PC 1002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a service consumer, the method comprising:

invoking a service provided by a first service producer, wherein invoking the service comprises:

generating a service request message; and transmitting the service request message to the first service producer, wherein transmitting the service request message to the first service producer comprises:

15 transmitting, to the first service producer, a message comprising a header and a body, the body comprising the service request message and the header comprising service consumer information comprising:

i) first feature information that identifies a set of one or more features of a service that is provided by a second service producer and that is supported by the service consumer, and/or ii) first version information that identifies set of one or more versions of an application programming interface (API) for the service provided by the second service producer that is supported by the service consumer.

2. The method of claim 1, wherein the service provided by the second service producer is associated with a name and the header comprises the name.

3. The method of claim 2, wherein the name is the name of the service or the name of the API for the service.

4. The method of claim 1, wherein the service provided by the second service producer includes a service operation for sending notifications of an event occurrence to the service consumer, and the service request message is a subscribe message for subscribing to the notifications of the event occurrence.

5. The method of claim 1, wherein the first service producer comprises an instance of a Unified Data Management (UDM) function.

6. The method of claim 1, wherein the second service producer comprises i) an instance of an Access and Mobility Management function and/or ii) an instance of a Session Management Function.

7. A method performed by a first service producer, the method comprising:

receiving a first message transmitted by a service consumer, wherein the first message comprises a header and a body, the body comprises a service request message, and the header comprises service consumer information comprising:

i) first feature information that identifies a set of one or more features of a service provided by a second service producer that is supported by the service consumer and/or ii) first version information that identifies a version of an application programming interface (API) for the service provided by the second service producer that is supported by the service consumer.

8. The method of claim 7, wherein the header is a third generation partnership project (3GPP) header.

9. The method of claim 8, wherein the 3GPP header comprises a 3gpp-Sbi-Binding header.

10. The method of claim 9, further comprising the first service producer transmitting to the second service producer a second message comprising the 3gpp-Sbi-Binding header.

11. The method of claim 7, further comprising the first service producer, in response to receiving the first message, selecting the second service producer based on the feature information and/or the version information included in the header of the first message.

12. The method of claim 11, further comprising, after selecting the second service producer, invoking a subscription service provided by the second service producer, wherein invoking the subscription service comprises: generating a second service request message; and transmitting the second service request message to the second service producer.

13. The method of claim 7, wherein the service provided by the second service producer includes a service operation for sending notifications of an event occurrence to the service consumer, and the service request message is for subscribing to the notifications of the event occurrence.

14. A method performed by a second service producer, the method comprising:

receiving a message transmitted by a first service producer, wherein the message comprises a header and a body, the body comprises a service request message, and the header comprises service consumer information comprising:

i) feature information that identifies a set of one or more features of a service provided by the second service producer that is supported by the service consumer and/or ii) version information that identifies a version of an application programming interface (API) for the service provided by the second service producer that is supported by the service consumer.

15. The method of claim 14, further comprising the second service producer using the service consumer information to provide a service to the service consumer.

16. The method of claim 15, wherein using the service consumer information to provide the service to the service consumer comprises the second service producer:

selecting a version of an application programming interface (API) based on the service consumer information; and transmitting a notification to the service consumer using the selected API.

17. The method of claim 15, wherein using the service consumer information to provide the service to the service consumer comprises the second service producer:

selecting a set of one or more information elements (IEs) based on the service consumer information; and transmitting to the service consumer a notification comprising the set of one or more IEs.

18. A method performed by a service consumer, the method comprising:

invoking a subscription service provided by a first service producer, wherein invoking the subscription service comprises:

generating a service request message; and transmitting the service request message to the first service producer, wherein the service request message comprises an information element (IE) comprising service consumer information comprising:

i) feature information that identifies a set of one or more features of a service provided by a second service producer that is supported by the service consumer and/or ii) version information that identifies a version of an application programming interface (API) for the service provided by the second service produce that is supported by the service consumer.

19. A method performed by a first service producer, the method comprising:

receiving a service request message transmitted by a service consumer, wherein the service request message comprises an information element (IE) comprising service consumer information comprising:

i) feature information that identifies a set of one or more features of a service provided by a second service producer that is supported by the service consumer and/or ii) version information that identifies a version of an application programming interface (API) for the service provided by the second service producer that is supported by the service consumer.

20. The method of claim 19, further comprising the first service producer, in response to receiving the service request message, selecting a second service producer based on the feature information and/or the version information included in the IE of the service request message, wherein the second service producer is an instance of the second service producer; and after selecting the second service producer, invoking a subscription service provided by the second service producer, wherein invoking the subscription service comprises: generating a second service request message; and transmitting the second service request message to the second service producer.

21. A non-transitory computer readable storage medium storing a computer program comprising instructions which when executed by processing circuitry of a network node causes the network node to perform the method claim 1.

22. A non-transitory computer readable storage medium storing a computer program comprising instructions which when executed by processing circuitry of a network node causes the network node to perform the method of claim 7.

23. A non-transitory computer readable storage medium storing a computer program comprising instructions which when executed by processing circuitry of a network node causes the network node to perform the method of claim 14.

24. A non-transitory computer readable storage medium storing a computer program comprising instructions which when executed by processing circuitry of a network node causes the network node to perform the method of claim 18.

25. A non-transitory computer readable storage medium storing a computer program comprising instructions which when executed by processing circuitry of a network node causes the network node to perform the method of claim 19.

* * * * *